United States Patent
Sproule et al.

(10) Patent No.: US 6,606,543 B1
(45) Date of Patent: Aug. 12, 2003

(54) METHOD AND APPARATUS FOR LOGGING INTO A VEHICLE COMPUTER SYSTEM

(75) Inventors: William David Sproule, Woodinville, WA (US); Polita Mila Huff, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/043,576

(22) Filed: Jan. 9, 2002

(51) Int. Cl.$^7$ .............................. G06F 3/00; G06F 3/14
(52) U.S. Cl. ..................... 701/1; 340/5.22; 340/5.51; 340/5.74; 340/5.81; 725/11; 725/13; 725/25; 725/28; 725/30; 345/661; 345/650
(58) Field of Search ................ 701/1, 36; 340/980, 340/705, 711, 439, 459, 5.21, 5.2, 5.22, 5.51, 5.4, 5.74, 5.8, 5.81, 5.85; 348/837; 345/339, 146, 970, 661, 650, 676; 725/10, 11, 13, 25, 28, 30, 34, 53

(56) References Cited

U.S. PATENT DOCUMENTS

| | | | |
|---|---|---|---|
| 5,519,410 A | * 5/1996 | Smalanskas et al. | 345/7 |
| 5,949,345 A | * 9/1999 | Beckert et al. | 340/815.41 |
| 6,055,478 A | * 4/2000 | Heron | 701/213 |
| 6,198,996 B1 | 3/2001 | Berstis | |
| 6,201,540 B1 | * 3/2001 | Gallup et al. | 345/339 |
| 2002/0002039 A1 | * 1/2002 | Qureshey et al. | 455/344 |
| 2002/0081985 A1 | * 6/2002 | Liu et al. | 455/186.1 |

OTHER PUBLICATIONS

"Voice Recognition Digital Cipher Lock for Smart Vehicles", Hassan, Beardslee and Arnold, 1993, IEEE, pp. 352–355.

"The implications of engine management systems in vehicle security", Kershaw and Wright, IMechE, 1989, pp. 183–190.

"Integrating Face Recognition into Security Systems", Vetter, Zielke and von Seelen, Audio– and Video–Based Biometric Person Authentication. First Int'l Conference, 1997, pp. 439–448.

"Automotive Application of Biometric Systems and Fingerprint", Lichtermann and Pettit, Human Factors in 2000: Driving, Lighting, Seating Comfort, and Harmony in Vehicle Systems, SAE 2000 World Congress, Mar. 2000, pp. 1–7.

"Safe Access, Ignition and Convenience at the Driver's Fingertips", Siemens Automotive Corp., News Release, Sep. 1999, pp. 1–3.

"Custom Cars For Every Driver", Allison Wright, ComputerWorld, Mar. 2001, 3 pages.

* cited by examiner

Primary Examiner—Thomas G. Black
Assistant Examiner—Tuan C To

(57) ABSTRACT

A vehicle computer system includes a first button that initiates a user login procedure. A second button allows a user to select among multiple password characters. A display device displays the multiple password characters including a currently selected password character. Another button is used to enter the selected password characters for validation. The second button may be rotatable, such that the user of the vehicle computer system is able to scroll through the list of multiple password characters by rotating the second button.

51 Claims, 5 Drawing Sheets

METHOD AND APPARATUS FOR LOGGING INTO A VEHICLE COMPUTER SYSTEM

TECHNICAL FIELD

This invention relates to vehicle computer systems for vehicles and, more particularly, to an interface that allows a user to enter a password for logging into a vehicle computer system.

BACKGROUND OF THE INVENTION

As car stereo systems (including vehicle computer systems and vehicle entertainment systems) become more sophisticated, it is desirable to allow users to log in to the car stereo system. Requiring each user to log in to the car stereo system allows the user's identity to be verified and any information stored in the car stereo system (or accessible by the car stereo system) is protected from access by unauthorized users. For example, when a user logs into the car stereo system, the user may also be coupled to a network to receive email and other information via the car stereo system. Additionally, information such as radio station presets, and address and phone number information may be stored in the car stereo system for each user of the system. When a user logs into the car stereo system, the appropriate radio presets and other information for that particular user are retrieved and made available to the user.

Adding a user login feature to a car stereo system presents several problems. First, a car stereo has a limited number of buttons and does not typically include a full keyboard such as those found on a traditional computer. Additionally, if the user is driving the vehicle, their primary task is the driving of the vehicle, not manipulating the car stereo controls to enter a password. Thus, it is desirable that the password entry process be simple and primarily use the existing buttons on the car stereo system rather than introducing a significant number of new buttons or controls specifically for logging into the car stereo system. Adding a significant number of new buttons or controls to support the user login functions may distract the driver from the primary task of driving the vehicle. A significant number of new buttons or controls may also increase the size, cost, and complexity of the car stereo system.

One solution for logging into a car stereo system uses a biometric technique, such as a fingerprint reader or a retina scanner. However, these systems add to the cost and complexity of the car stereo system because they require a separate reading or scanning device.

Another solution for logging into a car stereo system uses a smartcard or similar device that stores information about the user. However, this solution is inconvenient to the user because the user must carry the smartcard and make the smartcard available each time the user wants to use the car stereo system.

Therefore it is desirable to provide a user login procedure that is simple to perform while using at least a portion of the existing car stereo buttons and controls.

SUMMARY OF THE INVENTION

The systems and methods described herein provide a simple interface for logging into a vehicle computer system (such as a car stereo system) using many of the existing buttons and controls of the car stereo system. The interface allows a user of a vehicle computer system to easily identify themselves to the vehicle computer system and enter a password containing one or more password characters.

In one embodiment, a first button on the vehicle computer system initiates a login procedure. A second button allows a user to select among multiple password characters. A display device displays the multiple password characters, including a currently selected password character.

According to one aspect of the invention, the second button is rotatable such that a user can scroll through the multiple password characters by rotating the second button.

Another embodiment receives login information from multiple users of a vehicle computer system. Each user has an associated set of profile information. The profile information of the multiple users is merged to create a merged set of profile information. At least a portion of the merged set of profile information is displayed by the vehicle computer system.

BRIEF DESCRIPTION OF THE DRAWINGS

The same reference numerals are used throughout the drawings to reference like components and features.

DETAILED DESCRIPTION

Figure 1:
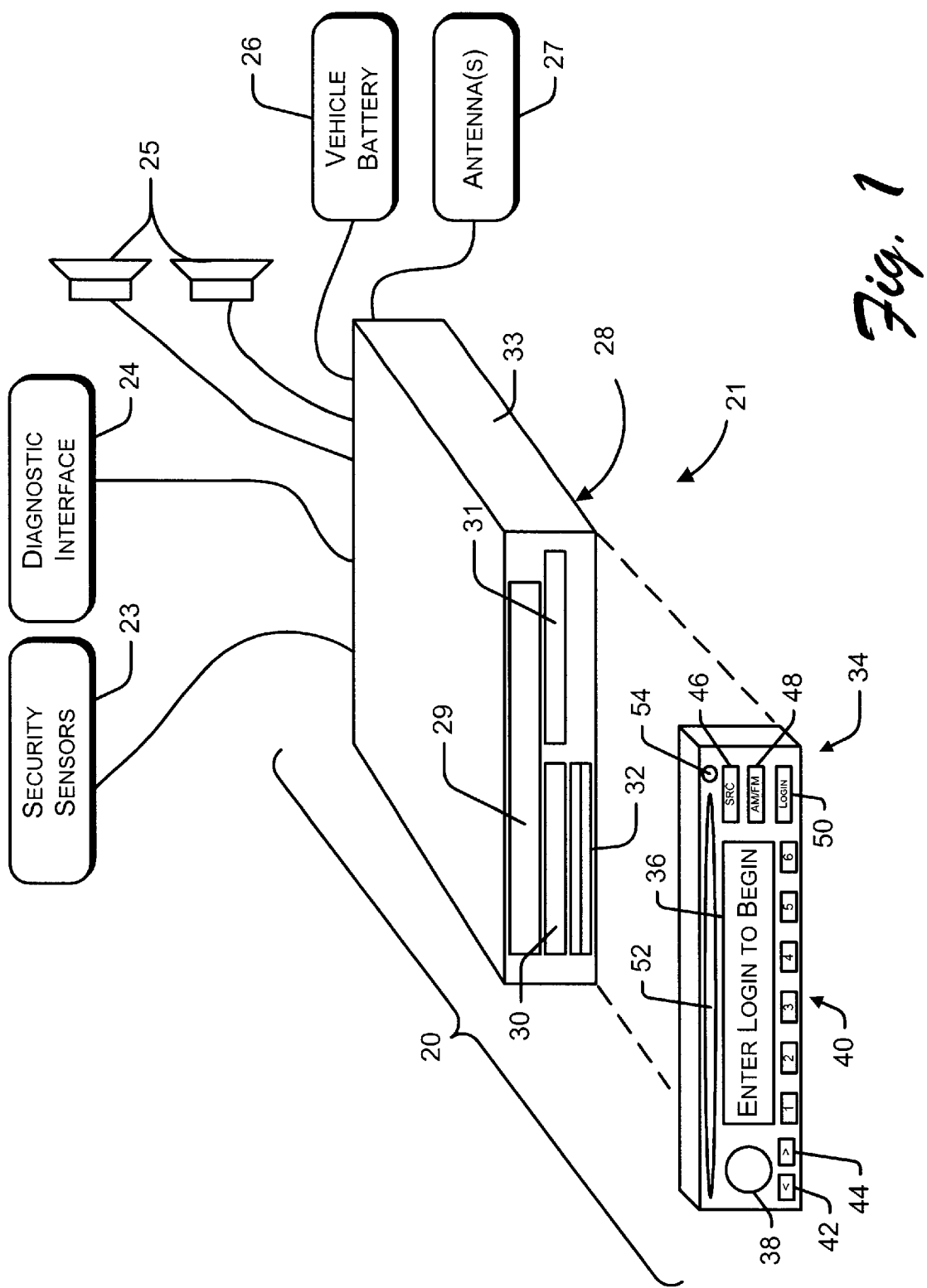
FIG. 1 is a diagrammatic illustration of a vehicle computer system.

FIG. 1 shows an example implementation of a vehicle computer system 20. Vehicle computer system 20 has a centralized computer 21 coupled to various peripheral devices, including security sensors 23, a vehicle diagnostic interface 24, speakers 25, vehicle battery 26, and antenna(s) 27. The computer 21 is assembled in a housing 28 that is sized to be mounted in a vehicle dashboard, similar to a conventional car stereo. Preferably, the housing 28 has a form factor of a single DIN (Deutsche Industry Normen). But, it possibly could be housed in a 2 DIN unit or other special form factor for an OEM. The methods and systems described herein may be applied to any type of vehicle computer system, vehicle entertainment system, or vehicle stereo system. In a particular embodiment, the vehicle computer system is a car stereo system.

The computer 21 includes at least one storage drive which permits the vehicle user to download programs and data from a storage medium. In the illustrated implementation, the computer 21 has a CD ROM drive 29 which reads application-related CDs, as well as musical, video, game, or other types of entertainment CDs. In this manner, the CD ROM drive 29 performs a dual role of storage drive and entertainment player. Also, a hard disk drive (not shown in FIG. 1) is included on the computer module which can be used for storing both application programs and user data. The computer 21 has an optional 3.5" floppy diskette drive 30, a smart card reader 31, and dual PCMCIA card sockets 32 which accept PCMCIA card types II and III. Hereinafter, the acronym "PC-Card" will be used in place of the acronym "PCMCIA." Although not shown in FIG. 1, computer 21 may also include a Digital Versatile Disc (DVD) drive which reads application-related DVDs, as well as video, musical, game, data (e.g., map data), or other types of DVDs.

The storage drives are mounted in a stationary base unit 33 of housing 28. The base unit 33 is constructed and sized to be fixedly mounted in the dashboard. The housing 28 also has a faceplate 34 which is pivotally mounted to the front of the base unit 33. The faceplate can be rotated to permit easy and convenient access to the storage drives.

Faceplate 34 functions as an operator interface, having a graphical display 36 and various buttons. The faceplate is mountable for viewing by a vehicle operator. The display 36 is preferably a backlit LCD panel having a rectangular array of pixels that are individually selectable for illumination or display. The LCD panel is preferably a medium-resolution, bit-mapped display system having at least 10,000 pixels. In the described implementation, the array of pixels has a size of at least 256×64 pixels. The operating system of computer 21 interacts with various buttons and faceplate display 36 as peripheral devices when the faceplate 34 is attached to the housing 28.

The faceplate 34 has a volume control input 38 and a keypad 40, which includes multiple number keys, labeled "1" through "6". The keypad 40 keys may be used as, for example, to identify radio station presets or to identify a particular user of the vehicle computer system. The faceplate 34 also has a "<" button 42 that represents either a reverse (or rewind) function or a radio tuning function that indicates the system should tune the radio to a lower frequency. A ">" button 44 represents either a fast-forward (or advance) function or a radio tuning function that indicates the system should tune the radio to a higher frequency.

The faceplate 34 also includes a "SRC" button 46 that selects a source for the vehicle computer system, such as a radio source or a CD player source. An "AM/FM" button 48 causes the radio portion of the vehicle computer system to toggle between an AM radio band and an FM radio band. Additionally, AM/FM button 48 may cause the functions of the buttons of keypad 40 to toggle between AM station presets and FM station presets.

A CD slot 52 allows a CD, such as a music CD, to be inserted into the CD ROM drive 29. Alternatively, a CD may be inserted into CD ROM drive 29 by pivoting or otherwise moving faceplate 34 such that the CD ROM drive is accessible by the user. An eject button 54 causes the CD ROM drive to eject the CD from the drive.

To load an application or data onto the computer 21, the vehicle user inserts a CD or diskette, if the application is not already contained on the hard disk, into the appropriate drive and the operating system downloads the application or data therefrom. The installation process can be automatically handled by the operating system, or with the assistance of commands input from the user in the form of keyed sequences on the keypad 40 or verbal instructions using a voice recognition device.

In general, the vehicle computer system 20 can be used to integrate multiple vehicle-related systems onto one open platform hardware and software architecture. For instance, the vehicle computer system 20 can serve as a multimedia entertainment system, a navigation system, a communications system, a security system, and a diagnostics system. Moreover, the vehicle computer system 20 provides additional functionality traditionally associated with desk-top and laptop personal computers. For instance, vehicle computer system 20 can support word processing applications, spreadsheet applications, database applications, and appointment/schedule applications. Furthermore, the vehicle computer system 20 can be configured to operate as a server to other computing units in the vehicle to distribute games, video movies, and the like to passengers.

In the embodiment discussed above, the faceplate 34 is pivotally mounted to the base unit 33. In alternate embodiments, faceplate 34 may be detached from the base unit 33. In other embodiments, faceplate 34 is permanently fixed to the base unit 33.

Figure 2:
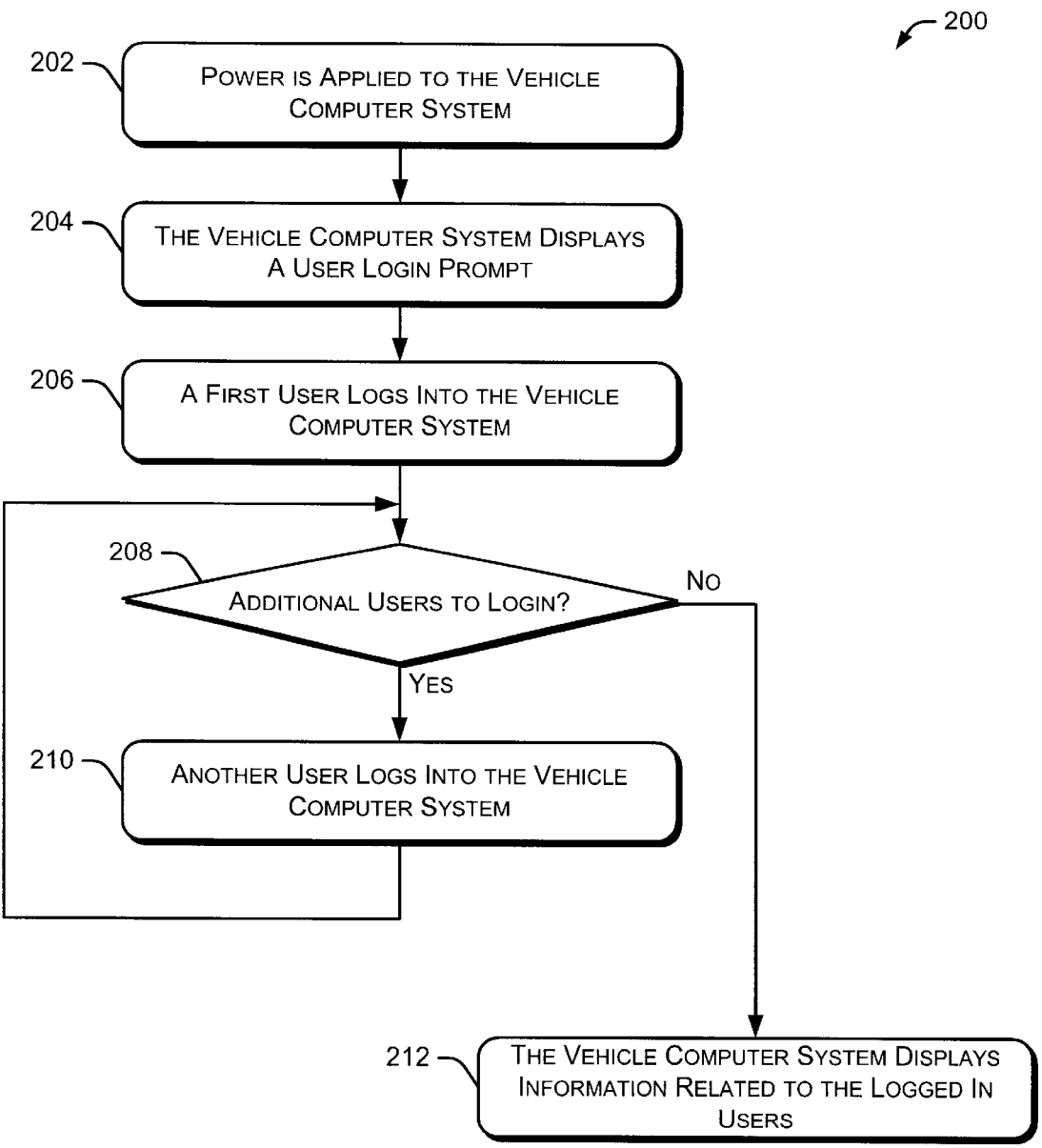
FIG. 2 is a flow diagram illustrating an embodiment of a procedure for logging into a vehicle computer system.

FIG. 2 is a flow diagram illustrating an embodiment of a procedure 200 for logging into a vehicle computer system. Initially, power is applied to a vehicle computer system (block 202) by, for example, activating a power button or starting the vehicle. The vehicle computer system displays a user login prompt on LCD 36 (block 204). An example login prompt is illustrated in FIG. 4. A first user logs into the vehicle computer system (block 206). The login procedure may require the user to identify themselves. This identity may be performed by pressing the "LOGIN" button 50 on faceplate 34 followed by a particular button on keypad 40. For example, a first user presses the "LOGIN" button and the "1" button (in the keypad), and a second user presses the "LOGIN" button and the "2" button. After identifying themselves, each user enters a password to gain access to their personal data (e.g., radio presets, CD presets, favorite CD list, favorite music list, address/telephone listings, and other data). An example password entry procedure is discussed below with respect to FIG. 3.

The procedure 200 then determines whether additional users want to login to the vehicle computer system (block 208). In a particular embodiment, any number of users may log into the vehicle computer system. For example, all occupants of a vehicle may want to log into the vehicle computer system. This allows all vehicle occupants to retrieve, for example, their favorite radio stations or favorite CD tracks. Additionally, all vehicle occupants can access a network, a personal information manager (PIM), or other features supported by the vehicle computer system.

In one embodiment, the vehicle computer system assumes that there are no additional users to log in until the "Login" button is pressed again. Thus, a user may log in after the vehicle has been started and other users have logged into the system. For example, if a vehicle stops to pick up another passenger, that passenger can log into the vehicle computer system by pressing the "Login" button and entering appropriate login information.

If additional users want to login to the vehicle computer system, the procedure 200 continues to block 210, where another user logs into the vehicle computer system. The procedure then returns to block 208 to determine whether any additional users want to login to the vehicle computer system. After all users have logged into the vehicle computer system, the procedure branches to block 212, where the vehicle computer system displays information related to one or more of the logged in users. The displayed information may include preset buttons associated with favorite radio stations, favorite CDs, favorite music tracks, etc. If multiple users logged into a vehicle computer system, the displayed information may include a combination of information from the multiple users. Additional details regarding the displayed information are discussed below.

Figure 3:
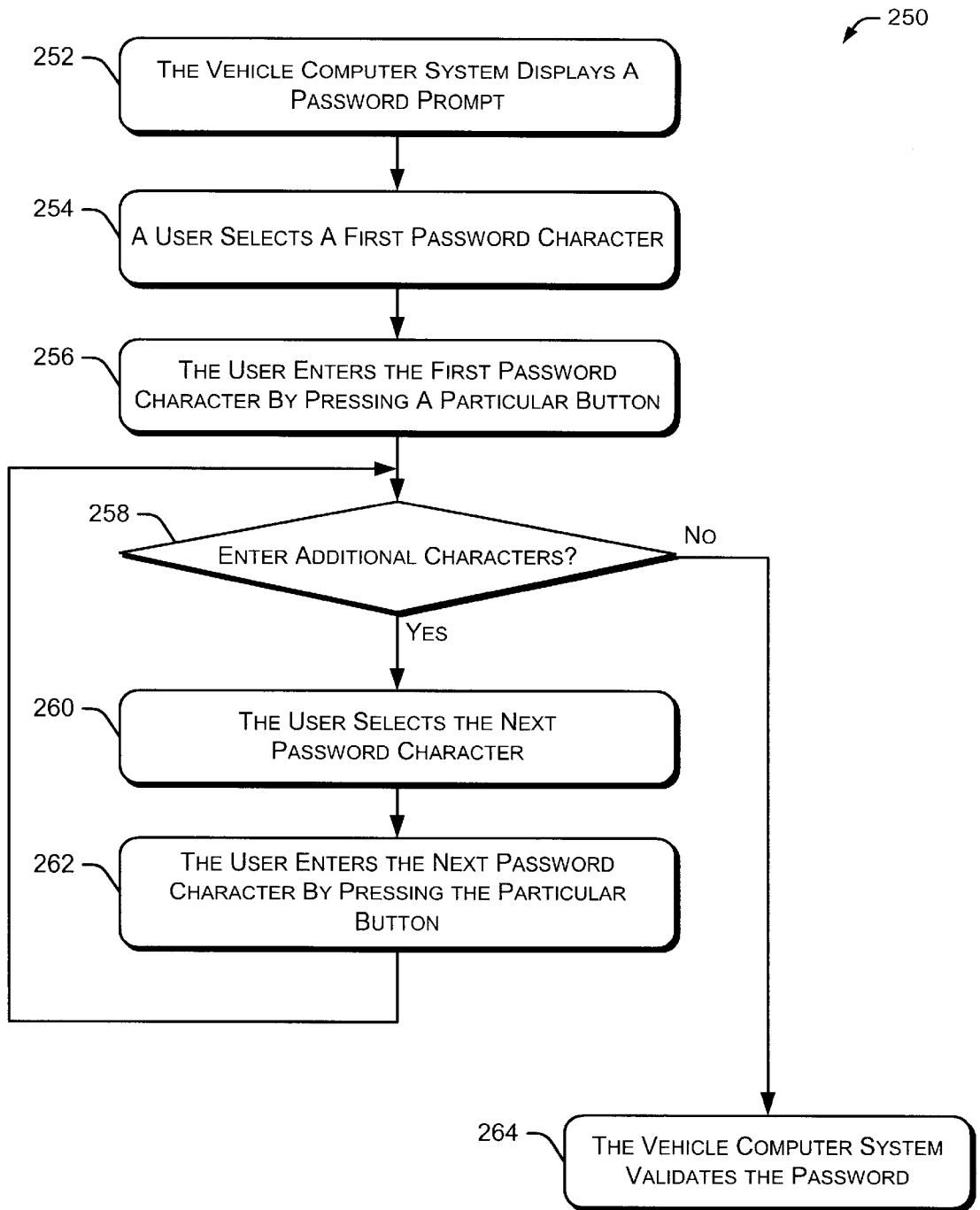
FIG. 3 is a flow diagram illustrating an embodiment of a procedure for providing a password to a vehicle computer system.
Figure 4:
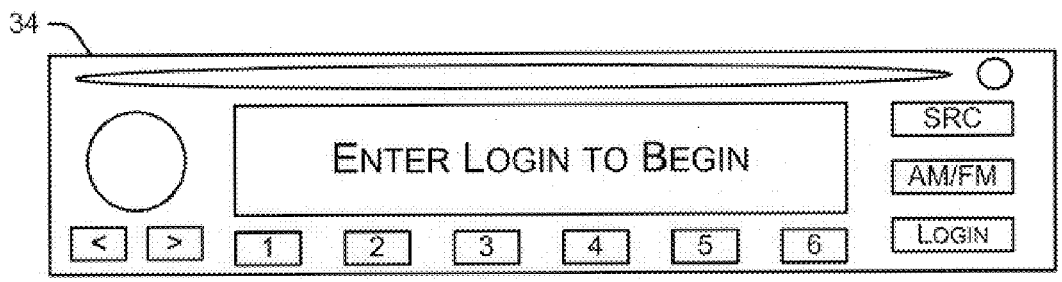
FIGS. 4–8 illustrate a vehicle computer system faceplate in different modes of operation.

FIG. 3 is a flow diagram illustrating an embodiment of a procedure 250 for providing a password to a vehicle computer system. Initially, the vehicle computer system displays a password prompt (block 252), such as "Enter Password:". A user then selects a first password character (block 254). The password character may be selected by manipulating a button or other control on the faceplate of the vehicle computer system. Manipulating the appropriate button or control causes the list of multiple password characters to scroll on the display of the vehicle computer system. At a particular time, a subset of all password characters is shown in the display due to the small size of the display. In a particular example, three password characters are displayed at a given moment. One of the displayed password characters is highlighted (e.g., made brighter than the other password characters, surrounded by a box or other identifier, displayed in a different color, displayed on a yellow background, identified by a pointer, or any other technique that sets one of the password characters apart from the other password characters being displayed). Examples of various password characters and the highlighting of password characters are discussed below.

When the desired password character is highlighted, the user presses a button or other control to select the highlighted password character as one of the characters in the password (block 256). In a particular embodiment, a rotary button is used to scroll through a list of password characters. When the desired password character is highlighted, the rotary button is presses to select the highlighted password character.

At block 258 of procedure 250, the procedure determines whether there are additional password characters to be entered. This determination can be performed by requiring the user to press a particular button indicating that the user is finished entering the password. Alternatively, the list of password characters may include a "Finished" character (or similar character) that, when selected, indicates that the user is finished entering password characters or some other sequence (such as spinning the knob rapidly twice in the same direction).

If there are additional password characters to be entered, the user selects the next password character (block 260). The user then enters the next password character by pressing the particular button for that action (block 262). The procedure then returns to block 258 to determine whether additional password characters need to be entered. After all password characters have been entered, the vehicle computer system validates the password (block 264). If the password is validated, the user is permitted to use the features offered by the vehicle computer system. Otherwise, the user is prevented from using the vehicle computer system (or is permitted to use a restricted set of features offered by the vehicle computer system).

If a particular user is validated after entering their password, the radio presets and other functions may be set to match the user's preferences (e.g., favorite radio stations, etc.). Additionally, the vehicle computer system may adjust other features of the vehicle to match the user's preferences, such as temperature settings, seat adjustments, and the like.

Any combination of buttons, knobs, switches, etc. can be used to enter a password. As used herein, "button" shall be defined as any button, knob, switch or other input mechanism activated by a user to input a password character. In particular, a first button selects the next character in the list of characters from which the password is selected. A second button selects the currently displayed (or highlighted) character. An optional third button selects the previous character in the list of characters from which the password is selected. In alternate embodiments, other buttons may be used to select password characters or to indicate that the user has finished entering the password. Other buttons may clear one or more previously selected characters if the user selects the wrong character. The examples discussed herein illustrate exemplary buttons and button arrangements. However, the methods and systems described herein may be used with any number of buttons and any type of button arranged in any configuration.

FIGS. 4–8 illustrate a vehicle computer system faceplate in different modes of operation. In particular, FIG. 4 illustrates a vehicle computer system faceplate displaying a login prompt. The faceplate shown in FIG. 4 is substantially the same as faceplate 34 shown in FIG. 1. The faceplate display indicates that the vehicle computer system is waiting for one or more users to log into the vehicle computer system.

Figure 5:
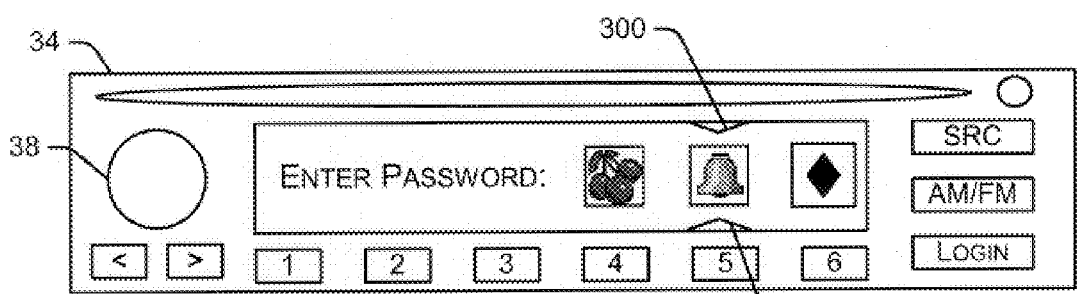

FIG. 5 illustrates a vehicle computer system faceplate displaying a password prompt and three password characters (cherries, a bell, and a diamond). A pair of pointers, 300 and 302, highlight a particular password character (the bell in this example). The three password characters represent a subset of the complete list of password characters. A particular list of password characters may include any number of characters. The password characters shown in FIG. 5 represent different symbols. In an alternate embodiment, the password characters may be letters, numbers, colors, or any combination of letters, numbers, colors, and/or symbols. In other embodiments, different sounds may be used alone or in combination with characters to identify a particular password entry. For example, a password may be represented by a sequence of sounds which may be entered without regard for what is being displayed on the faceplate. A particular password may contain any combination of sounds, visual characters, and the like.

In a particular embodiment, the user of the vehicle computer system scrolls through the list of password characters by rotating control knob 38 (also referred to as the "volume control input"). For example, if the control knob 38 is rotated counter-clockwise, the displayed password characters shift to the left, causing the leftmost password character (i.e., the cherries) to be replaced with the center password character (i.e., the bell). Additionally, the center password character is replaced with the rightmost password character (i.e., the diamond) and the rightmost password character is replaced with the next password character in the list (i.e., an apple).

Figure 6:
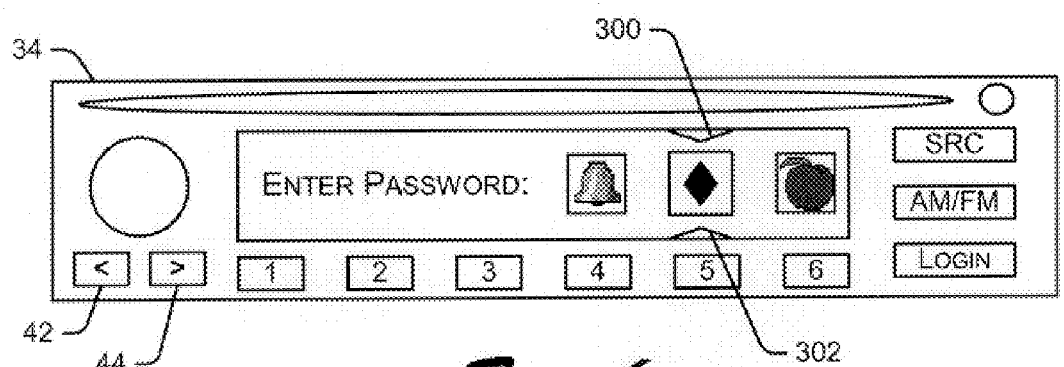

FIG. 6 illustrates the result of rotating control knob 38 one position to the left. In FIG. 6, the diamond is currently the highlighted password character, as indicated by the pointers 300 and 302. At this point, the user of the vehicle computer system can select the diamond by pressing control knob 38. Alternatively, a different button on faceplate 34 may be designated as the button used to select the highlighted password character.

Instead of control knob 38, any other button or buttons on faceplate 34 may be used to scroll through the list of password characters. For example, buttons 42 and 44 may be used to scroll in different directions through the list of password characters. In another embodiment, a single button (not shown) has three different positions: a center position (no scrolling), a left position (scroll left), and a right position (scroll right). For example, the single button may be a rocker switch that is normally centered, but can be depressed on the left side to scroll in one direction through the list of password characters and pressed on the right side to scroll in the opposite direction. Alternatively, the single button may be a rocker switch oriented in any position such that pressing one end of the button causes scrolling through the list of password characters in one direction and pressing the opposite end of the button causes scrolling in the opposite direction.

Although the examples of FIGS. 5 and 6 illustrate the display of three password characters simultaneously, alternate embodiments may display any number of password characters. Similarly any button (or combination of buttons)

can be used to scroll through the list of password characters and any button (or combination of buttons) can be used to select a highlighted password character.

Figure 7:

FIG. 7 illustrates a vehicle computer system faceplate displaying a welcome message to a particular user (i.e., Mark). The faceplate also displays favorite music CDs that have been previously identified by the user as favorites. Alternatively, the faceplate may display the stations associated with each radio preset or other information of interest to the user.

Figure 8:
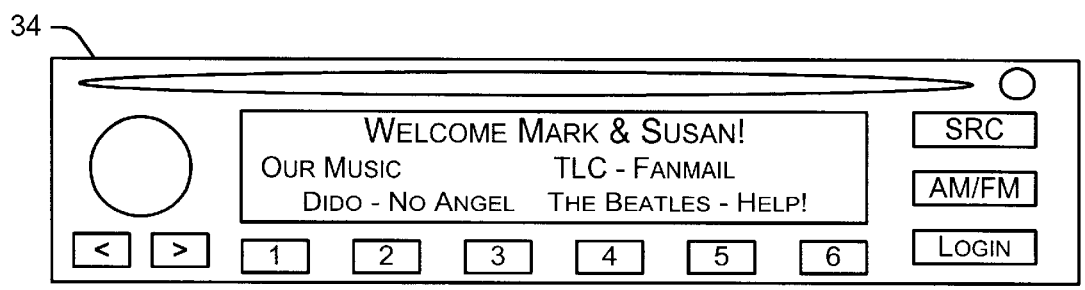

FIG. 8 illustrates a vehicle computer system faceplate displaying a welcome message to multiple users (i.e., Mark and Susan). In this example, the faceplate displays a merged list of music CDs, representing favorites of both users. Each user may have profile information that identifies their favorite radio stations, preferred radio station presets, favorite CDs, favorite songs, music preferences, volume settings, bass and treble settings, etc. When multiple users login to the same vehicle computer system, the vehicle computer system merges the individual user profiles together.

For example, when merging two user profiles the vehicle computer system may select one or two favorite CDs for each user to be displayed on the faceplate. With respect to radio station presets, the vehicle computer system may select the three favorite stations of the first user and assign those stations to preset buttons "1", "2", and "3", and select the three favorite radio stations of the second user and assign those stations to preset buttons "4", "5", and "6". The system may average the preferred volume, bass, treble, and other radio settings of the two users. Other data and information from user profiles and/or user preferences can be merged together by selecting a few favorite items for each of the multiple users and merging those favorite items into one or more displays.

The various displays and functions discussed above are provided by way of example. A particular car stereo system may display any number of types of information and perform any number of different functions, including information and functions not discussed herein. Further, the buttons and their arrangement as shown in the figures represents one possible implementation. In alternate embodiments, any number of switches, buttons, knobs, and other input devices may be provided to control the vehicle computer system (including inputting a password).

A particular vehicle computer system includes a memory capable of storing an operating system and one or more application programs that execute on one or more microprocessors. The microprocessor(s) are programmed by means of instructions stored at different times in various computer-readable storage media of the device. This storage media may include, for example, smart cards, a disk drive, or other volatile or non-volatile storage mechanism. Application programs are typically installed or loaded into the secondary memory of a computer. At execution, the application programs are loaded at least partially into the computer's primary electronic memory. The invention described herein includes these and other various types of computer-readable storage media when such media contain instructions or programs for implementing the steps and features described herein in conjunction with a microprocessor or other data processor. The invention also includes the computer and other devices themselves when programmed according to the methods and techniques described herein.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A vehicle computer system comprising:
a first button configured to initiate a login procedure;
a second button configured to select among a plurality of password characters; and
a display device coupled to the second button and configured to display the plurality of password characters, wherein the display device further displays a currently selected password character.

2. A vehicle computer system as recited in claim 1, further comprising a third button configured to enter the selected password characters.

3. A vehicle computer system as recited in claim 1, further comprising a fourth button configured to identify a particular user of the vehicle computer system.

4. A vehicle computer system as recited in claim 1, further comprising a fourth button configured to identify completion of the selection of password characters.

5. A vehicle computer system as recited in claim 1, wherein the second button is rotatable.

6. A vehicle computer system as recited in claim 5, wherein the second button selects among the plurality of password characters by scrolling through the plurality of password characters when the second button is rotated.

7. A vehicle computer system as recited in claim 1, wherein the password character is an audible sound.

8. A vehicle computer system as recited in claim 1, wherein the second button has multiple positions.

9. A vehicle computer system as recited in claim 8, wherein the second button selects among the plurality of password characters by scrolling through the password characters in a first direction when the second button is moved to a first position and scrolling through the password characters in an opposite direction when the second button is moved to a second position.

10. A vehicle computer system comprising:
a first button configured to initiate a login procedure;
a second set of buttons configured to identify a user initiating the login procedure;
a third button configured to select among a plurality of password characters; and
a display device coupled to the third button and configured to display the plurality of password characters.

11. A vehicle computer system as recited in claim 10, wherein the display device is further configured to display a currently selected password character.

12. A vehicle computer system as recited in claim 10, wherein the display device is further configured to simultaneously display a subset of the plurality of password characters, wherein one of the subset of the plurality of password characters is highlighted.

13. A vehicle computer system as recited in claim 10, further comprising a fourth button configured to enter a plurality selected password characters.

14. A vehicle computer system as recited in claim 10, wherein the third button is rotatable to select among the plurality of password characters by scrolling through the plurality of password characters when the third button is rotated.

15. A user interface for a vehicle stereo system, the user interface comprising:
a first button configured to initiate a login procedure;

a second button that is rotatable in a first direction and an opposite direction, the second button configured to scroll through a plurality of password characters, the second button further configured to select a highlighted password character when the second button is pressed; and a display device coupled to the second button for displaying the highlighted password character.

16. A user interface as recited in claim 15, wherein rotating the second button in the first direction scrolls through the plurality of password characters in a first direction and rotating the second button in the opposite direction scrolls through the plurality of password characters in a second direction, wherein the second direction is opposite the first direction.

17. A user interface as recited in claim 15, further comprising a third button configured to enter a plurality of selected password characters.

18. A user interface as recited in claim 15, further comprising a third button configured to terminate selection of password characters.

19. A user interface as recited in claim 15, wherein the second button is further configured to adjust an audio volume of the vehicle stereo system.

20. A user interface for a vehicle stereo system, the user interface comprising:

a first button configured to initiate a login procedure;

a second button that has a first position and a second position, the second button configured to scroll through a plurality of password characters in a first direction when the second button is in the first position, and the second button further configured to scroll through the plurality of password characters in an opposite direction when the second button is in the second position;

a third button configured to select a highlighted password character; and a display device coupled to the second button for displaying the highlighted password character.

21. A user interface as recited in claim 20, wherein the second button has a third position in which the scrolling of the plurality of passwords stops.

22. A user interface as recited in claim 20, further comprising a fourth button configured to terminate selection of password characters.

23. A user interface as recited in claim 20, wherein the second button is further configured to adjust an audio volume of the vehicle stereo system.

24. A user interface as recited in claim 20, wherein the second button is further configured to change radio frequencies.

25. A user interface as recited in claim 20, wherein the second button is further configured to change music tracks on a CD.

26. A method comprising:

receiving a first login request from a first user of a vehicle computer system;

displaying a password prompt to the first user of the vehicle computer system;

receiving a first password from the first user of the vehicle computer system;

validating the first password;

receiving a second login request from a second user of the vehicle computer system;

displaying the password prompt to the second user of the vehicle computer system;

receiving a second password from the second user of the vehicle computer system; and validating the second password.

27. A method as recited in claim 26, wherein the first password is received through a user interface of the vehicle computer system.

28. A method as recited in claim 26, wherein the first login request is received from a first button of the vehicle computer system.

29. A method as recited in claim 26, wherein the first password is entered by the first user through a rotatable control.

30. A method as recited in claim 26, wherein the second password is entered by the second user through a rotatable control.

31. A method as recited in claim 26, further comprising displaying information associated with the first user.

32. A method as recited in claim 26, further comprising displaying music favorites associated with the first user.

33. A method as recited in claim 26, further comprising displaying information associated with the first user and the second user.

34. A method as recited in claim 26, further comprising displaying music favorites associated with the first user and displaying music favorites associated with the second user.

35. A method as recited in claim 26, further comprising displaying favorite radio stations associated with the first user and displaying favorite radio stations associated with the second user.

36. A method comprising:

activating a first button to initiate a login procedure on a vehicle computer system;

activating a second button to identify a plurality of password characters; and activating a third button to select one of the plurality of password characters.

37. A method as recited in claim 36, wherein activating the second button includes manipulating the second button to highlight a desired password character.

38. A method as recited in claim 36, wherein activating the second button includes rotating the second button to highlight a desired password character.

39. A method as recited in claim 36, further comprising activating a fourth button to identify completion of the selection of password characters.

40. A method as recited in claim 36, further comprising reactivating the first button to initiate the login procedure on the vehicle computer system.

41. A method comprising:

receiving login information from a first vehicle computer system user;

identifying a first set of profile information associated with the first vehicle computer system user;

receiving login information from a second vehicle computer system user;

identifying a second set of profile information associated with the second vehicle computer system user;

merging the first set of profile information with the second set of profile information to create a merged set of profile information; and displaying at least a portion of the merged set of profile information.

42. A method as recited in claim 41, wherein the first set of profile information includes radio presets defined by the first vehicle computer system user.

43. A method as recited in claim 41, wherein the second set of profile information includes radio presets defined by the second vehicle computer system user.

44. A method as recited in claim 41, wherein the merged set of profile information includes radio presets defined by the first vehicle computer system user and radio presets defined by the second vehicle computer system user.

45. A method as recited in claim 41, wherein displaying at least a portion of the merged set of profile information includes displaying a subset of the radio presets defined by the first vehicle computer system and displaying a subset of the radio presets defined by the second vehicle computer system.

46. A method as recited in claim 41, wherein the first set of profile information includes favorite music identified by the first vehicle computer system user and the second set of profile information includes favorite music identified by the second vehicle computer system user.

47. A method as recited in claim 41, wherein displaying at least a portion of the merged set of profile information includes displaying a subset of the favorite music identified by the first vehicle computer system user and displaying a subset of the favorite music identified by the second vehicle computer system user.

48. One or more computer-readable media having stored thereon a computer program that, when executed by one or more processors, causes the one or more processors to:

display a login prompt on a vehicle computer system;

receive a login request from a user of the vehicle computer system;

display a password prompt on the vehicle computer system;

receive a password from the user of the vehicle computer system, wherein the password is entered using a multi-position control button;

validate the received password; and allow the user to operate the vehicle computer system if the received password is validated.

49. One or more computer-readable media as recited in claim 48, wherein the multi-position control button is a rotatable control button.

50. One or more computer-readable media as recited in claim 48, wherein the one or more processors further receive a login request from a second user of the vehicle computer system.

51. One or more computer-readable media as recited in claim 48, wherein the one or more processors further display information regarding the user of the vehicle computer system if the received password is validated.

* * * * *

UNITED STATES PATENT AND TRADEMARK OFFICE
CERTIFICATE OF CORRECTION

PATENT NO.     : 6,606,543 B1                                        Page 1 of 1
DATED          : August 12, 2003
INVENTOR(S)    : Sproule et al.

It is certified that error appears in the above-identified patent and that said Letters Patent is hereby corrected as shown below:

<u>Column 8,</u>
Line 33, replace number "8" with number -- 1 --.

Signed and Sealed this

Thirteenth Day of January, 2004

JON W. DUDAS
*Acting Director of the United States Patent and Trademark Office*